United States Patent
Dewar et al.

(10) Patent No.: US 8,535,008 B2
(45) Date of Patent: Sep. 17, 2013

(54) TURBINE AND COMPRESSOR EMPLOYING TUBERCLE LEADING EDGE ROTOR DESIGN

(75) Inventors: Stephen W. Dewar, Toronto (CA); Phillip Watts, Long Beach, CA (US); Frank Eliot Fish, Downingtown, PA (US)

(73) Assignee: Whale-Power Corporation, Toronto, Ontario (CA)

( * ) Notice: Subject to any disclaimer, the term of this patent is extended or adjusted under 35 U.S.C. 154(b) by 1055 days.

(21) Appl. No.: 11/577,461

(22) PCT Filed: Oct. 18, 2005

(86) PCT No.: PCT/CA2005/001596
§ 371 (c)(1), (2), (4) Date: Oct. 6, 2008

(87) PCT Pub. No.: WO2006/042401
PCT Pub. Date: Apr. 27, 2006

(65) Prior Publication Data
US 2009/0074578 A1 Mar. 19, 2009

Related U.S. Application Data

(60) Provisional application No. 60/619,002, filed on Oct. 18, 2004.

(51) Int. Cl.
*F03D 11/00* (2006.01)
(52) U.S. Cl.
USPC ...................................... 416/170 R; 416/228

(58) Field of Classification Search
USPC .................. 416/228, 170 R, 155; 290/44, 55
See application file for complete search history.

(56) References Cited

U.S. PATENT DOCUMENTS

| | | | |
|---|---|---|---|
| 2,272,358 A | | 2/1942 | Steinhaus |
| 2,584,663 A | * | 2/1952 | Bensen ........................ 416/147 |
| 3,403,893 A | * | 10/1968 | Stoffer .......................... 416/228 |
| 4,323,209 A | | 4/1982 | Thompson |
| 5,096,378 A | * | 3/1992 | Jamieson ........................ 416/23 |
| 5,755,408 A | * | 5/1998 | Schmidt et al. ............... 244/204 |
| 6,431,498 B1 | | 8/2002 | Watts et al. |
| 6,769,873 B2 | * | 8/2004 | Beauchamp et al. ............. 416/3 |
| 6,779,978 B2 | * | 8/2004 | Camargo Do Amarante ..................... 416/228 |
| 7,004,724 B2 | * | 2/2006 | Pierce et al. .................... 416/61 |
| 7,042,109 B2 | * | 5/2006 | Gabrys .......................... 290/44 |

FOREIGN PATENT DOCUMENTS

| | | |
|---|---|---|
| CA | 2068539 | 3/1992 |
| DE | 296 02 674 | 4/1996 |
| GB | 791563 | 3/1958 |

(Continued)

OTHER PUBLICATIONS

International Search Report issued in PCT/CA2005/001596 on Nov. 23, 2005.
Supplementary European Search Report dated Feb. 16, 2011 in corresponding European Application No. EP 05 79 7075.

(Continued)

*Primary Examiner* — Ninh H Nguyen
(74) *Attorney, Agent, or Firm* — Faegre Baker Daniels LLP

(57) ABSTRACT

A turbine/compressor comprises at least one magneto-electric device and a drive train coupled to the magneto-electric device. At least one rotor blade is coupled to the drive train. The rotor blade has a shaped leading edge with a series of spaced tubercles formed therealong.

30 Claims, 4 Drawing Sheets

(56) References Cited

FOREIGN PATENT DOCUMENTS

| | | |
|---|---|---|
| GB | 2036881 | 7/1980 |
| GB | 2185788 | 7/1987 |
| JP | 2001-132615 | 5/2001 |
| WO | 98/22711 | 5/1998 |
| WO | WO2004022969 | 3/2004 |
| WO | WO2004057182 | 7/2004 |

OTHER PUBLICATIONS

Canadian Office Action dated Mar. 14, 2012 in corresponding Canadian Application No. 2,587,946.
Chinese Office Action dated Jul. 11, 2008 in corresponding Chinese Application No. 200580043110.5.
Chinese Office Action dated May 6, 2010 in corresponding Chinese Application No. 200580043110.5.

* cited by examiner

TURBINE AND COMPRESSOR EMPLOYING TUBERCLE LEADING EDGE ROTOR DESIGN

FIELD OF THE INVENTION

The present invention relates generally to the effective capture of force from wind and other moving fluids including but not limited to water and steam and the conversion of that force into the generation of electrical power, or other usable forms of energy. More particularly, the present invention relates to a novel turbine and compressor employing a tubercle leading edge rotor design configured to enhance lift and reduce drag.

BACKGROUND OF THE INVENTION

Windmills and water mills have been used for centuries to pump water or to power a wide range of mechanical devices. Over the past century both have become important means of electrical power generation.

In recent years there has been considerable effort expended to improve the efficiency of wind and water turbines used for electrical power generation with a view to reducing dependence on non-renewable resources. Significant expansion of the power generating capacity of such wind and water turbines will however be highly dependent on improvements in existing technology. This is due to the fact that "prime sites" for wind and water turbines, which have comparatively high mean energy flows and are in reasonable proximity to roads and power grids, are becoming scarce. As a consequence, it is widely recognized that if projected future increases in the power generation capacity of wind and water turbines are to be met, current technologies must be improved so as to derive more energy from the existing wind and water turbines at prime sites. Such improvements of course must also enable efficient deployment of wind and water turbines at secondary sites, which offer lower mean energy flows. Indeed, initiatives to improve existing wind and water turbines technologies are underway worldwide in a number of public and private programs, many of which are referred to as either "Low Wind Speed" or "Low (Water) Head" technologies.

The development of low wind speed and low water head technologies has been actively encouraged by governments in many countries. For example, in the United States of America, the Department of Energy has established public/private partnerships to encourage development of both types of power generation. Typically, these strategies involve the development of turbines with larger rotors and large installations designed to capture more energy by interacting with a larger portion of the fluid flow.

Recent research and development on low wind speed and low head water turbines, and especially, low wind speed turbines, clearly demonstrates that to-date, improvements have been incremental rather than fundamental. With respect to the development of low wind speed turbines for example, virtually every low wind speed turbine research project is designed to explore the same short list of options, including the following:
(a) development of larger turbines to harvest a larger inflow area;
(b) development of taller towers to carry larger rotor blades and to take advantage of higher wind speed at greater heights;
(c) more efficient combinations of generators, drive train devices and improved power electronics;
(d) development of more flexible turbines and towers, (including hinged blades, flexible configurations and fabrication means, etc.); and,
(e) various approaches which allow operation under highly variable wind conditions such as gusts.

Future research projects are also expected to yield incremental improvements to other technologies used to design, manufacture and control low wind speed turbines. For example, it is anticipated that advanced drive trains, new rotor fabrication techniques, and improvements to low wind speed turbine control and monitoring technology will be developed. These improvements in conjunction with lower costs to assemble very tall, low wind speed turbines on site will lead to increases in the power generation capacity of low wind speed turbines.

It is important to note that virtually all low wind speed turbine research projects have centered on the development of larger turbines capable of producing between 1 and 6 megawatts of electricity. This increase in scale has occurred despite the fact that larger turbine rotors are often less efficient than smaller ones from a cost point of view. The cost of land for sites, aesthetic considerations and the cost of establishing grid connections, maintenance costs and the costs to build access roads, can far exceed any benefit that is derived by the improved power generation capacity of these larger low wind speed turbines. It is also important to note that designing low wind speed turbines with larger turbine rotors suffers other problems aside from being cost inefficient. As the size of turbine blades increase, the turbine towers must grow in both size and strength. Current scales already require tower sections which are near the limit of what can be transported over existing roads and erected on site. Flexible or hinged blades and so-called "soft" (or slightly flexible) towers offer some potential for further growth in the scale of low wind speed turbines but it appears that conventional technology is approaching the upward limits of practical scale.

Similar inherent problems have affected the deployment of larger scale, low water head turbines. Attempts to increase the inflow scale have imposed considerable construction costs and placed practical limits on the number of sites with enough flow to warrant expenditures.

It will be appreciated from the foregoing that there is a need for improvements in wind and water turbine and compressor design, which offer a increased efficiency without significant increases in costs. It is therefore an object of the present invention to provide a novel turbine/compressor.

SUMMARY OF THE INVENTION

A wind or water turbine/compressor with improved efficiency as compared to prior art turbine/compressor designs is provided. This is achieved by making use of a rotor that exhibits enhanced lift, reduced aerodynamic and parasitic drag performance, and improved resistance to stall.

Accordingly, in one aspect there is provided a turbine/compressor comprising:
at least one magneto-electric device;
a drive train coupled to said magneto-electric device; and
at least one rotor blade coupled to said drive train, said rotor blade having a shaped leading edge configured to enhance lift and reduce drag.

The leading edge may include a series of spaced tubercles formed therealong. The turbine/compressor may further comprise a control system to adjust the orientation of the rotor blade so that the rotor blade faces incoming fluid flow. The turbine/compressor may also include a second control system to alter the shape of the rotor blade. The second control system may alter the pitch of the rotor blade and/or may alter the spacing and/or shape of the tubercles.

In one embodiment, the drive train is a shaft directly coupling the rotor blade and the magneto-electric device. In another embodiment, the drive train includes a drive shaft and transmission arrangement acting between the rotor blade and magneto-electric device.

According to another aspect there is provided a turbine/compressor comprising:
  at least one generator;
  a drive train coupled to said generator; and
  at least one rotor blade coupled to said drive train, said rotor blade having a shaped leading edge with a series of spaced tubercles formed therealong.

The turbine/compressor provides advantages in that the additional lift generated by the rotor blades does not contribute additional drag but rather, improves the lift to drag ratio. As a consequence, since the rotor blades exhibit lower drag, less structural strength is required for the supporting towers in any given wind environment. This of course translates into lower costs. Also, by adjusting the orientation of the rotor blades so that they are more steeply pitched into the fluid flow, lift can be further enhanced. The enhanced lift characteristics allow more power to be captured from available fluid flows. The improved stall characteristic of the rotor blade results in a reduction of drag thus, permitting the rotor blade to operate over a wider range of fluid flow rates and further increasing the amount of power that can be captured from the available fluid flow. In addition, the shape of the rotor blades helps to reduce span-wise pumping and hence, rotor tip turbulence and thus, reduces noise.

BRIEF DESCRIPTION OF THE DRAWINGS

Embodiments will now be described more fully with reference to the accompanying drawings in which.

DETAILED DESCRIPTION OF THE EMBODIMENTS

Figure 1A:
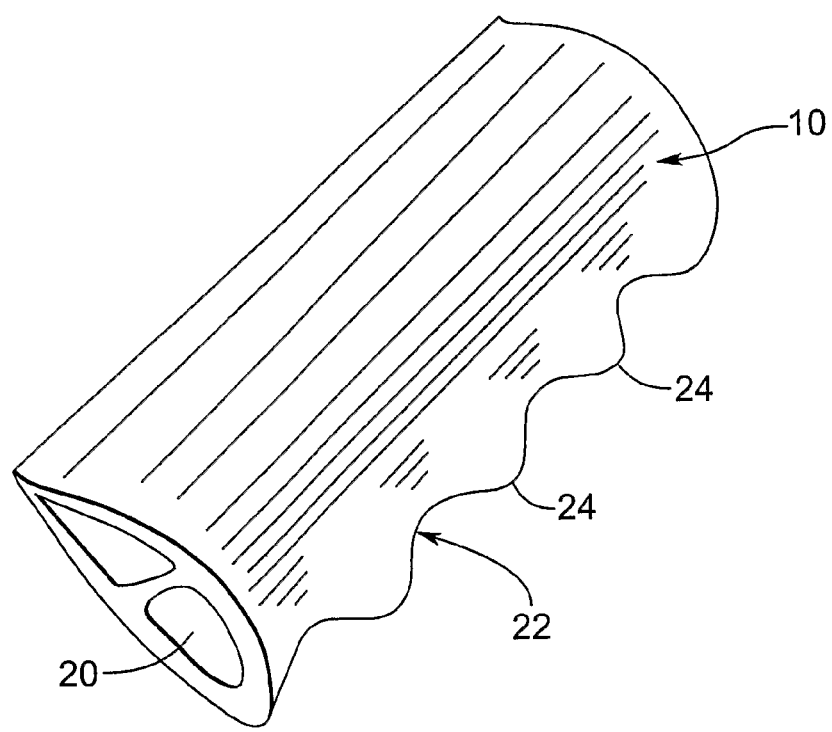
FIG. 1A is a perspective view of a section of a turbine rotor blade having tubercles along its leading edge in front of the rotor blade's load bearing spar.
Figure 1B:
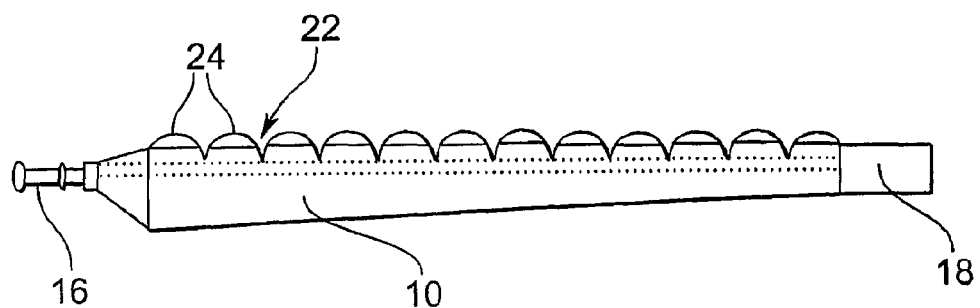
FIG. 1B is a plan view of a turbine rotor blade having protuberances along its leading edge, the twist in the rotor blade being omitted for ease of illustration.
Figure 2:
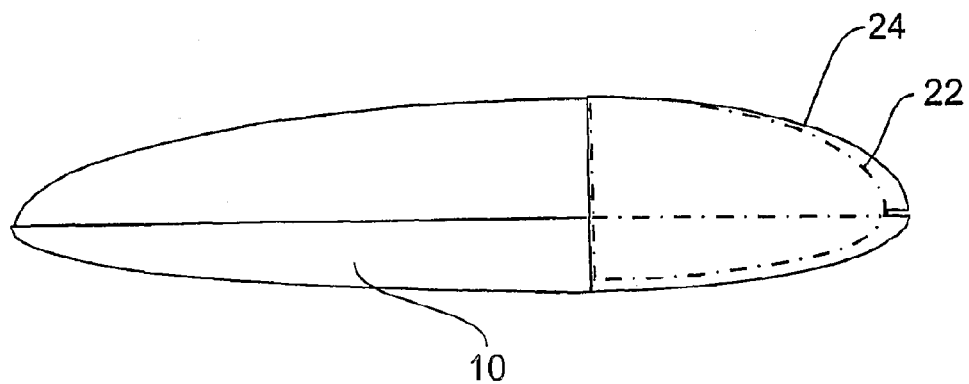
FIG. 2 is a side view of the turbine rotor blade section depicted in FIG. 1A.

Turning now to FIGS. 1A, 1B and 2, a turbine rotor blade is shown and is generally identified by reference numeral 10. As can be seen, the turbine rotor blade 10 is coupled to a fixed hub 12 (see FIG. 3A) and has a blade body 14 extending from a root 16 to a blade tip 18. A structural beam such as a D-spar 20 is integrally formed within the blade body 14 allowing rotational power to be transmitted to the hub 12. The blade body 14 has a leading edge 22.

Unlike conventional turbine rotor blades, the leading edge 22 is provided with tubercles 24 along its length between the root 16 and the blade tip 18 similar to those described in U.S. Pat. No. 6,431,498, the content of which is incorporated herein by reference. The tubercles 24 in this case are generally evenly spaced along the leading edge 22 and provide the rotor blade 10 with enhanced lift and better stall characteristics while at the same time, reducing the drag that the rotor blade 10 exhibits.

Although not illustrated, the turbine rotor blade 10 is in fact twisted to account for the different wind speeds encountered by the rotor blade 12 between the blade tip 18 and the root 16 as a result of the rotor blade rotating about the fixed hub 12. For example, if the speed of the rotor tip 18 is 64 m/s, the speed at a point along the rotor blade 12 that is one-quarter of the distance from the hub 12 will be 16 m/s. As is known to those of skill in the art, the stall characteristics of the rotor blade 10 are a function of the speed of the fluid flow and the angle at which the fluid flow strikes the rotor blade. The twist along the rotor blade 10 avoids having one part of the rotor blade stall, thus producing a braking force on rotation, while another part of the rotor blade is generating lift, which produces rotation.

As the tubercles 24 on the leading edge 22 of the rotor blade 10 provide the rotor blade with enhanced lift and better stall characteristics, the degree of twist provided in the rotor blade 10 is selected to take these characteristics into account so that the enhanced lift and better stall characteristics can be translated into an increase in electrical power generation efficiency. In particular, the enhanced lift characteristic of the rotor blade 10 allows more power to be captured from available fluid flows. The improved stall characteristic of the rotor blade results in a reduction of drag thus, permitting the rotor blade 10 to operate over a wider range of fluid flow rates and further increasing the amount of power that can be captured from the available fluid flow. This latter feature is of particular importance in the light of the requirement to twist the rotor blade in order to reduce stall at inner radii in that it permits the portion of the rotor blade 12 nearer the root 16 to be pitched at a steeper angle. As a result, lift is generated at the inner portion of the rotor blade 10 unlike in conventional rotor designs. In addition, the tubercles 24 on the leading edge 22 of the rotor blade 10 reduce span-wise pumping and hence blade tip turbulence and as a result reduce noise.

Figure 3A:
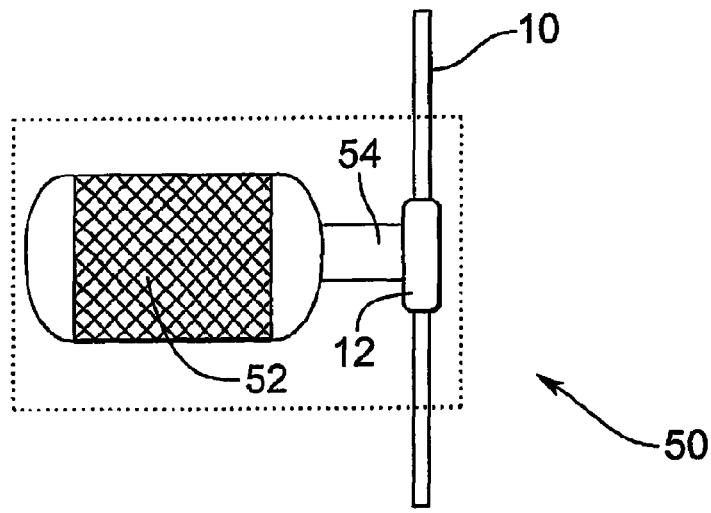
FIG. 3A is a side view of a simplified fluid flow turbine employing turbine rotor blades of the type shown in FIGS. 1A and 1B or conventional turbine rotors blade fitted with the rotor blade attachments of FIG. 1C coupled to a generator via a direct drive shaft.

Turning now to FIG. 3A, a turbine 50 employing rotor blades 10 of the above-described type is shown. As can be seen, turbine 50 includes a generator 52 coupled to the hub 12 by a rotor drive shaft 54. The turbine 50 in this embodiment is particularly suited for use in stable fluid flow environments such as for example falling water flows, steam generators, and gas/jet turbine generators etc., which can be operated so as to produce a controlled fluid flow rate to the rotor blades 10. Providing such a controlled fluid flow to the rotor blades 10 imparts rotation of the rotor blades 10 and hub 12, which in turn imparts rotation of the drive shaft 54. As the drive shaft 54 is directly attached to the rotor of the generator 52, rotation of the rotor results in the production of electricity at a stable optimized rate.

Alternatively, the turbine 50 may be configured as a direct drive wind turbine. In this case, the generator 52 includes a permanent magnet rotor (not shown) directly connected to the drive shaft 54. Rotation of the magnetic rotor results in the generation of a variable electric current. The generated variable electric current is in turn fed to power control electronics for conversion into current which can be fed to an electrical grid or to local electrical devices. In this embodiment, the turbine preferably includes either manual or automatic means for orienting the turbine relative to the wind as will be described. The size of the generator 52 is preferably matched to the typical wind flow levels so as to achieve desired efficiencies.

The turbine 50 may also be employed in a direct drive configuration deployed in high head water power and steam turbine applications where the fluid flow engaging the rotor blades 10 is fast enough to turn the drive shaft 54 at high speed, or where very large scale generators 52 may be deployed. In such applications where the fluid flow is controlled so that it remains at or near to a desired rate, the design of the rotor blades 10 can be matched to the known flow rates allowing maximum power to be generated without requiring active or passive control of rotor stall. However, in applications where the fluid flow rate is variable in either an ambient or controlled manner, the rotor blade may be configured to maintain passive power control (via the stall characteristics of the blade) or active power control through actuation of pitch adjustments. One or both of these power control techniques is employed preferentially when the turbine is deployed as a wind turbine. It should be noted as a practical matter that existing generator designs suitable for direct drive operations at low-to-moderate rotation rates tend to be too large for economic deployment on wind turbines above 6 MW.

It is possible to employ stall or pitch control to maintain a reasonable constant rate of rotation for such turbines. However, it is well known in the art that wind turbines are less efficient when operated at constant rotation rates. As a consequence, direct drive wind turbines should be capable of operating at variable speeds falling between a cut-in wind speed that is sufficient to overcome inertia and friction, and a cut-out speed which could do damage. The power generated may be processed by power electronics, (not shown, but well known to the art), in order to render it suitable for operations of electrical devices or for delivery in a suitably stable form to the electrical power distribution grid.

Figure 3B:
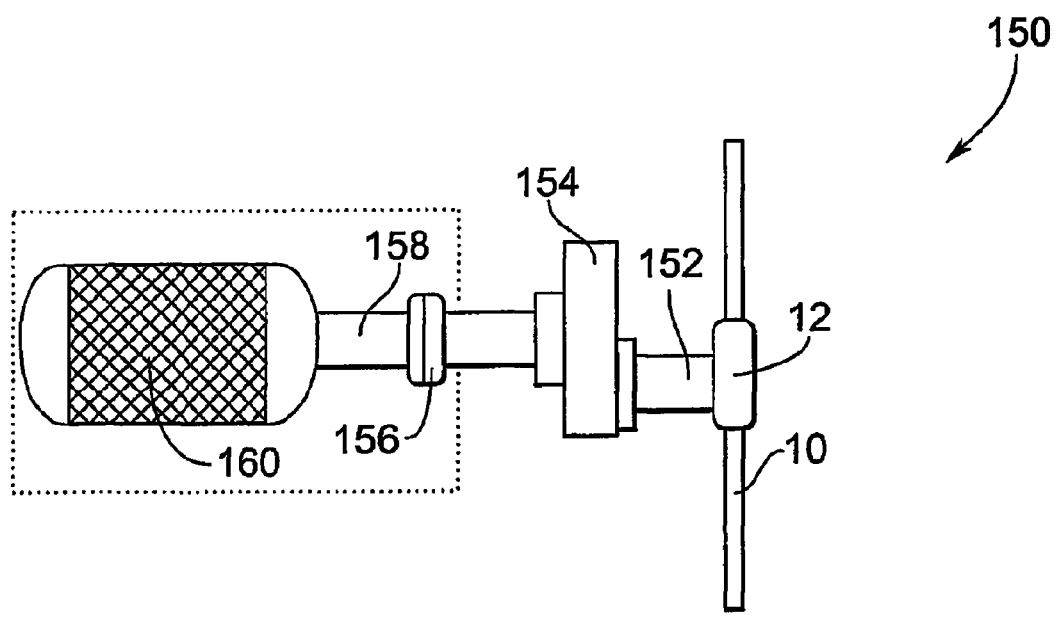
FIG. 3B is a side view of a simplified fluid flow turbine generator employing manually adjustable turbine rotor blades of the type shown in FIGS. 1A and 1B or conventional turbine rotor blades fitted with the rotor blade attachments of FIG. 1C coupled to a generator via a gear train.

FIG. 3B shows a turbine 150 for use in a slow fluid flow environment that also employs rotor blades 10 of the above-described type. In this embodiment, the hub 12 is coupled to a low speed drive shaft 152. Drive shaft 152 is coupled to a gearbox or transmission 154 which in turn drives a high speed drive shaft 156. High speed drive shaft 156 is coupled to the drive shaft 158 of a high speed generator 160. High speed generators are typically, smaller and cheaper than slow speed generators. The generator 160 is preferably sized to match the fluid flow characteristics of the slow fluid flow environment.

Adjustment of the rotor characteristics, (pitch, yaw, twist, tubercle deployment, flexibility, damping, etc.), may be effected by hand or under dynamic control. Such manual and dynamic control systems are well known to the art.

Figure 3C:
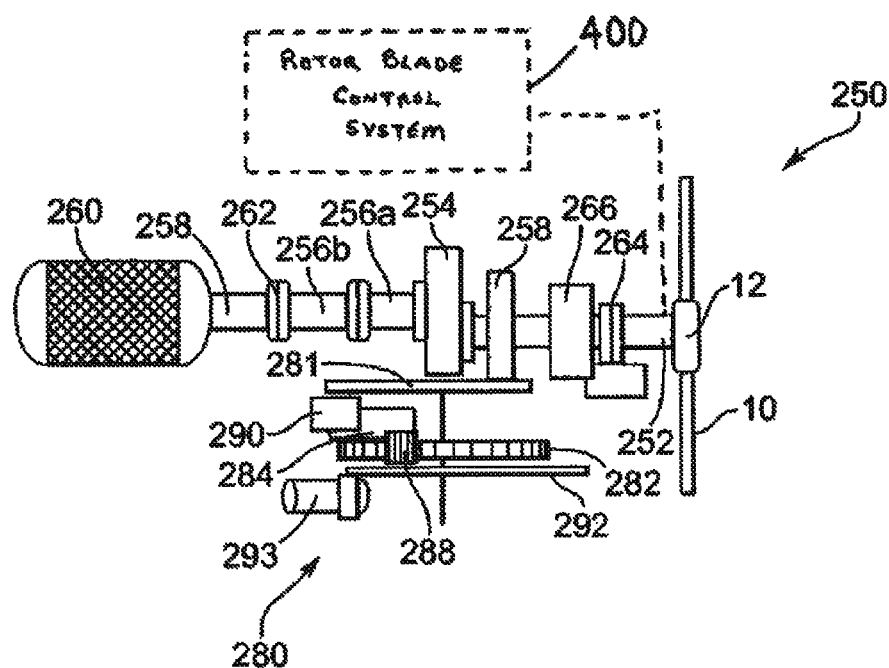
FIG. 3C is a side view of a turbine employing turbine rotor blades of the type shown in FIGS. 1A and 1B or conventional turbine rotor blades fitted with the rotor blade attachments of FIG. 1C with a yaw drive for maintaining the orientation of the rotor blades so that it faces into incoming fluid flow.

FIG. 3C shows another turbine 250 for use in a slow fluid flow environment that similarly employs rotor blades 10 of the above-described type. In this embodiment, the hub 12 is coupled to a low speed drive shaft 252. Drive shaft 252 is coupled to a gearbox or transmission 254 which in turn drives high speed drive shafts 256a and 256b. High speed drive shaft 256b is coupled to the drive shaft 258 of a high speed generator 260 via a clutch and/or brake system 262. A rotor brake 264 and a slip ring 266 are provided on the drive shaft 252.

A yaw control system 280 is coupled to a turbine mount assembly 281, which supports the rotor, drive train and generator to allow the entire assembly to be rotated in order to maintain the orientation of the rotor blades 10 in the desired upwind direction. As can be seen, yaw control system 280 includes a yaw gear 282 driven by a yaw drive 284 via a pinion 288. A yaw servo 290 senses wind speed and controls the yaw drive 284 via an encoder (not shown) to allow the rotor blade orientation to be adjusted. Yaw servo 290 also controls yaw brake 292 to allow the rotor blades 10 to be locked into position.

If desired, the turbine 250 can also include a rotor blade pitch control system for adjusting the pitch of the rotor blades so as to control the rotation rate of the high and/or low speed shafts to match the rotation rates to the generator. As will be appreciated, the rotor blade pitch control system is similar to the above-described yaw control system. As the tubercle enhanced rotor blades display a broader operating range of stable lift, the rotor blade pitch control may be adjusted to maintain a steeper pitch into fluid flows of any speed and hence increase maximum power generation. The rotor blade pitch control system preferably can be employed to feather the rotor blades in the event of exceptionally high speed wind gusts which would otherwise damage the rotor blades, drive train and/or generator. Further, despite the fact that the tubercle enhanced rotor blades will tend to produce less drag than conventional blades at most pitch angles, in some cases wind speeds may produce enough drag to impose potentially damaging forces on the tower. In such cases, the rotor blade pitch control system may be employed to adjust the rotor blade pitch in response to a sensor and feedback control loop (not shown), which monitors wind speed and if required, structural strain on the tower and provides suitable control signals to the rotor blade pitch control system.

In another embodiment, the turbine 250 may be designed to accommodate changes in fluid flow rates which occur slowly, (i.e. flow rate changes which occur over days, weeks or months). Low head water courses face such slow variations in flow rates. In this case, a combination of methods and means to accommodate these slow fluid flow variations can be employed. For example, the turbine 250 may include a turbine rotor blade control system 400 identified by the dotted lines in FIG. 3C to vary the twist, pitch, camber, thickness and even the size of the tubercles on the leading edges of the rotor blades. To this end, the outer skin of the rotor blades 10 may be formed of flexible material and stretched over the supporting substrate. Hydraulic, electromechanical and/or piezoelectric actuators may be provided along the rotor blades that can be actuated to change the shape of the rotor blades. The leading edges of the rotor blades may comprise a combination of moveable and fixed components comparable to flaps on airplane wings with the moveable components being adjustable relative, to the fixed components to modify the aerodynamic or hydrodynamic characteristics of the rotor blades. The turbine rotor blade control system may be responsive to mechanical adjustments made by an operator and/or responsive to position encoders and/or sensors measuring fluid flow rates, rotor characteristics, and turbine operating parameters.

In yet another embodiment, the turbine 250 may also be designed to cope with situations where fluid flow rates are subject to periodic changes of significant magnitude which might otherwise result in damage to the generator or other components of the assembly. In this case, the turbine may include a force diverting system such as for example, an active braking system in concert with an appropriate transmission, an automated characteristic adjustment mechanism to reduce rotor efficiency by increasing stall or feathering the rotor blades. The force diverting system may be responsive to mechanical adjustments made by an operator and/or responsive to position encoders and/or sensors measuring fluid flow rates, rotor characteristics, and turbine operating parameters.

As will be appreciated, further modifications to the turbine 250 are preferred if the turbine is to be used in situations where fluid flow rates undergo frequent significant variations, as is often the case in wind turbine applications. Wind energy flow rates are, as a rule, vastly more variable than water flow rates. This variability in the wind energy resource potential varies widely by season, large scale weather patterns, geographic region, local physical and geographic features such as land shapes, (hills, valleys, etc.), nearby trees and other surface obstructions, and, even time of day. A discussion of wind variability is available at the US-DOE website, the website of the Danish Wind Power Association and the Canadian government Strategis site.

In reality, there are vast differences in mean wind speed, and, hence available potential power, from region to region. For example, in the continental USA, only a small fraction of the land mass experiences mean wind speeds above 8 meters per second, (classified as Class 6 and Class 7 wind sites). Areas with wind resources on the order of Class 1 through Class 5 make up the bulk of the country's resources. In addition, such mean wind speeds are far from uniform. Winds rise and fall everywhere, but in Class 6 and higher regions, the net impact is largely insignificant. The turbine 250 can be tailored for these lower standards but make use of control systems to deal with high speed wind gusts using either active or passive braking or by employing a clutch system to avoid generator overheating, or changing the rotor blade pitch angles to effectively brake against excess rotational rates by adjusting the rotor blades toward stall.

Conventional technology is suitably efficient for energy production in Class 6 or higher wind environments but typically, these systems produce electricity at 50-60% of the rate in Class 4 environments, which dramatically increases costs. Such technology is marginally economic at best for Class 3 and lower.

Figure 3D:
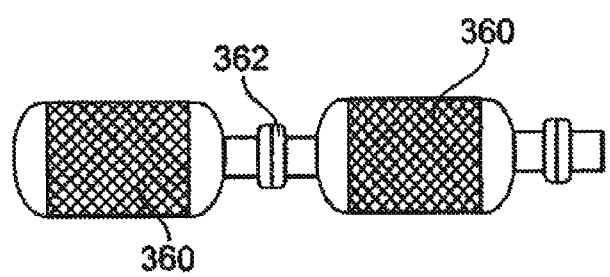
FIG. 3D is a side view of in-line generators employing turbine rotor blades of the type shown in FIGS. 1A and 1B or conventional turbine rotor blades fitted with the rotor blade attachments of FIG. 1C.

For Class 6 and higher sites, the turbine 250 may include active control systems to control rotor blade characteristics as previously described. The enhanced lift and reduced drag resulting from the use of the rotor blades 10 produces more rotational power to the rotor axis, which may be directed to produce higher rotational rates or more torque. However, the rotor blades will also stall at lower wind speeds, which means they will also operate over a larger range of wind speeds and as a consequence the power transmitted to the drive shaft will vary across a wider range. Methods and means to operate over the entire effective range and to increase electrical energy production may include the use of an automatic transmission which may be shifted under the control of an electronic monitoring circuit in order to keep generator rotational rates as close to constant as possible. Also, the turbine may employ two or more small, high speed, in-line generators 360 in series, linked by clutches 362 (whether electromagnetic or mechanical) as shown in FIG. 3D such that as wind speeds change the desired amount of electricity is produced. For example, when encountering high speed winds, the turbine might employ three generators linked to the drive shaft by clutches. Two linked generators might be employed for moderate winds and only one generator employed when presented with low wind conditions. In all such cases, sophisticated power regulation control circuits may be employed in order to produce higher quality power and to deliver the maximum power to the end user or to a power grid. As will be appreciated, using small high speed generators in line provides advantages. For example, the in-line generator arrangement reduces blockage of air flow through the turbine and provides serviceability benefits in that one or more generators can still operate if one is being serviced. Also, the smaller generators are easier to transport and assembly.

Also, in Class 6 and Class 7 areas which enjoy comparatively high mean wind speeds, it is well known that conventional large turbine rotors have distinct problems with high speed rotation. Rotor blades on the order of 40 to 70 meters often encounter significantly different winds at the top of their rotation than at the bottom because wind speed tends to vary with height. This may be compounded by largely unpredictable low level jet streams which impact the rotor blades only at the top of their rotation. A further difficulty is that even in stable wind regimes the tip of the rotor blade is traveling much faster than is the root of the rotor blade and hence is subject to quite different stresses. In some cases, these factors produce powerful vibrations which can stress the rotor blade structure and lead to its premature failure. To deal with these factors, the turbine 250 when used in such high wind speed environments may include passive damping of the rotor blade, both passive and active braking to maintain rotation rates within tolerances, and active braking of the sort discussed previously to impose an additional load on the rotor shaft in order to control rates of rotation. The turbine may also employ one or more sensor means (which may be mechanical, optical, etc.) by which a control circuit can monitor the rotor blade for such vibration and actively compensate for unwanted blade vibration. This compensation process may involve the deployment of passive damping, a change in any and all rotor blade characteristics and/or, active compensation for unwanted vibrations by sensing them very quickly, and generating an active waveform 180 degrees out of phase with the vibration in order to effect cancellation of the vibrations by phased feedback.

Figure 1C:
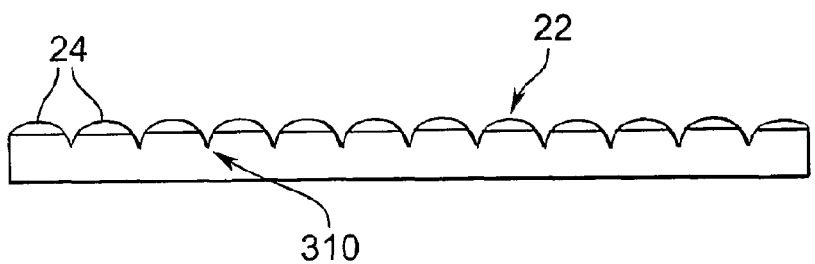
FIG. 1C is a plan view of a rotor blade attachment having protuberances along its leading edge, the twist in the rotor blade attachment being omitted for ease of illustration.

Although the above embodiments, show a rotor blade design where the tubercles 24 are integrally formed along the leading edge 22 of the rotor blade 10, alternatives are available. For example, turning now to FIG. 1C, a rotor blade attachment suitable for retrofitting to an existing conventional rotor blade is shown and is generally identified by reference numeral 310. Such a rotor blade attachment may be attached to the leading edge 22 of the rotor blade 10 by various conventional means in order to provide the rotor blade with enhanced lift and reduced drag. Such a retrofit rotor blade attachment should preferentially be employed with adjustments to all associated subsystems including but not limited to operating parameters, subsystem control software, environmental sensors and automated response, pitch servo actuator operations, etc. as discussed below. It should be noted that such retrofits should preferentially be made to rotor blades implemented with pitch controlled power control in which enhanced lift may be implemented without compromising passive power control. The application of such retrofit leading edges to conventional stall-regulated rotor blades will require the fabrication of the component in such a way as to convert the twisted form factor of a conventional rotor in line with this invention. Such retrofit components must be engineered within such trade-off parameters to adjust the actual form factor of individual stall-controlled rotors.

The fundamental operating principals and indeed many of the engineering criteria of turbine generators and compressors are identical. As such, the turbines discussed above are applicable for use in basically all forms of compressors, fans and turbine generators. In other words the rotor blades can used in a huge range of products such as for example compressors for jet engine turbines including turboprops, cars, air conditioning units, water turbines, thermal and nuclear steam turbines, jet boat power system, rotary fans, rotary and turbine pumps, pressure washers to name but a few.

As will be appreciated by those of skill in the art, the turbines may be deployed in cases where fluid flows are constant at or near mean flow rates. In such instances, only minimal means are required to match appropriate gearing, generators, and electrical and electronic power generation control devices. Alternatively, the turbines may be used in cases where fluid flows are widely variable.

Although embodiments of the present invention have been described, those of skill in the art will appreciate that variations and modifications may be made without departing from the spirit and scope thereof as defined by the appended claims.

What is claimed is:

1. A rotating machine comprising:
   at least one magneto-electric device;
   a drive train coupled to said magneto-electric device; and
   a plurality of rotor blades coupled to said drive train, each rotor blade having a continuous shaped leading edge extending generally the length of said rotor blade, said leading edge comprising a series of spaced tubercles formed therealong, said tubercles being configured to enhance lift, provide improved stall characteristics, reduce drag and reduce span-wise pumping.

2. A rotating machine according to claim 1 further comprising at least one control system configured to adjust the orientation of said rotor blades so that said rotor blades face incoming fluid flow.

3. A rotating machine according to claim 2 wherein said at least one control system is further configured to alter the pitch of said rotor blades.

4. A rotating machine according to claim 2 wherein said at least one control system is further configured to alter at least one of the spacing and shape of said tubercles.

5. A rotating machine according to claim 1 wherein said drive train is a shaft directly coupling said rotor blades and said magneto-electric device.

6. A rotating machine according to claim 1 wherein said drive train includes a drive shaft and transmission arrangement acting between said rotor blades and magneto-electric device.

7. A rotating machine according to claim 6 further comprising at least one control system configured to adjust the orientation of said rotor blades so that said rotor blades face incoming fluid flow.

8. A rotating machine according to claim 7 wherein said at least one control system is further configured to alter the pitch of said rotor blades.

9. A rotating machine according to claim 7 wherein said at least one control system is further configured to alter at least one of the spacing and shape of said tubercles.

10. A turbine comprising:
    at least one generator;
    a drive train coupled to said generator; and
    a plurality of rotor blades coupled to said drive train, each rotor blade having a continuous shaped leading edge extending generally the length thereof with a series of spaced tubercles formed therealong, said tubercles being configured to enhance lift, provide improved stall characteristics, and reduce at least one of drag and span-wise pumping.

11. A turbine according to claim 10 further comprising at least one control system to adjust the orientation of said rotor blades so that said rotor blades face incoming fluid flow.

12. A turbine according to claim 11 wherein said at least one control system is further configured to alter the pitch of said rotor blades.

13. A turbine according to claim 12 wherein said drive train is a shaft directly coupling said rotor blades and said generator.

14. A turbine according to claim 12 wherein said drive train includes a drive shaft and transmission arrangement acting between said rotor blades and generator.

15. A turbine according to claim 14 further comprising a plurality of linked generators.

16. A turbine according to claim 15 wherein said linked generators are in-line.

17. A turbine according to claim 11 wherein said at least one control system is further configured to alter at least one of the spacing and shape of said tubercles.

18. A rotating machine comprising:
    at least one magneto-electric device;
    a drive train coupled to said magneto-electric device;
    a plurality of rotor blades coupled to said drive train, each rotor blade having a shaped leading edge configured to enhance lift and reduce drag, said leading edge comprising a series of spaced tubercles formed therealong; and
    at least one control system configured to alter at least one of the spacing and shape of said tubercles.

19. A rotating machine according to claim 18 wherein said at least one control system is configured to adjust the orientation of said rotor blades so that said rotor blades face incoming fluid flow.

20. A rotating machine according to claim 19 wherein said at least one control system is further configured to alter the pitch of said rotor blades.

21. A rotating machine according to claim 18 wherein said drive train is a shaft directly coupling said rotor blades and said magneto-electric device.

22. A rotating machine according to claim 18 wherein said drive train includes a drive shaft and transmission arrangement acting between said rotor blades and magneto-electric device.

23. A rotating machine comprising:
    at least one magneto-electric device;
    a drive train coupled to said magneto-electric device; and
    a plurality of rotor blades coupled to said drive train, each of said rotor blades comprising a tip and a root, each rotor blade undergoing a twist between said tip and root, each rotor blade having a series of spaced tubercles formed along a continuous leading edge thereof, said tubercles being configured to enhance lift, improve stall characteristics of said rotor blade and reduce at least one of drag and span-wise pumping, the degree of twist being selected to take said enhanced lift and improved stall characteristics into account.

24. A rotating machine according to claim 23 further comprising at least one control system operable to adjust the orientation of said rotor blades so that the leading edges of said rotor blades face incoming fluid flow.

25. A rotating machine according to claim 24 wherein said at least one control system is further operable to alter the pitch of said rotor blades.

26. A rotating machine according to claim 24 wherein said at least one control system is further operable to alter at least one of the spacing and shape of said tubercles.

27. A rotating machine according to claim 24 wherein said at least one control system is further operable to alter both the spacing and shape of said tubercles.

28. A rotating machine according to claim 23 wherein said drive train is a shaft directly coupling said rotor blades and said magneto-electric device.

29. A rotating machine according to claim 23 wherein said drive train comprises a drive shaft and transmission arrangement acting between said rotor blades and magneto-electric device.

30. A rotating machine according to claim 23 wherein said rotating machine is one of a turbine and a compressor.

* * * * *